(12) United States Patent
Her

(10) Patent No.: US 10,011,254 B2
(45) Date of Patent: Jul. 3, 2018

(54) PULSATION DAMPING DEVICE OF HYDRAULIC BRAKE SYSTEM

(71) Applicant: MANDO CORPORATION, Pyeongtaek-si, Gyeonggi-do (KR)

(72) Inventor: Young-Chae Her, Incheon (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/258,802

(22) Filed: Sep. 7, 2016

(65) Prior Publication Data
US 2017/0066423 A1    Mar. 9, 2017

(30) Foreign Application Priority Data

Sep. 8, 2015  (KR) .................... 10-2015-0126783

(51) Int. Cl.
*B60T 13/16*    (2006.01)
*B60T 8/40*     (2006.01)
(Continued)

(52) U.S. Cl.
CPC ........... *B60T 8/4068* (2013.01); *B60T 8/4291* (2013.01); *B60T 8/4872* (2013.01)

(58) Field of Classification Search
CPC ........ B60T 8/4068; B60T 7/22; B60T 8/1755; B60T 8/368; B60T 8/4291; B60T 8/4872; B60T 2201/02
(Continued)

(56) References Cited

U.S. PATENT DOCUMENTS 3,757,825 A * 9/1973 Givens ..................... B60T 8/42
137/593
5,096,400 A * 3/1992 Budecker ............ F04B 11/0091
417/540
(Continued)

FOREIGN PATENT DOCUMENTS

CN    201177261 Y    1/2009
CN    101555922 A    10/2009
(Continued)

OTHER PUBLICATIONS

Korean Office Action dated Jun. 20, 2016 issued in Korean Patent Application No. 10-2015-0126783.
(Continued)

*Primary Examiner* — Pamela Rodriguez
(74) *Attorney, Agent, or Firm* — McDermott Will & Emery LLP

(57) ABSTRACT

Disclosed herein is a pulsation damping device of a hydraulic brake system. The pulsation damping device of a hydraulic brake system which attenuates a pressure pulsation of brake oil discharged from a pump, the device comprises a damping portion installed to be inserted into a bore in communication with an inport into which the brake oil flows and an outport through which the brake oil is discharged, and a cap coupled to one end of the bore to block the one end, wherein a flow path is formed on an outer circumferential surface of the damping portion to guide the brake oil introduced into the inport to be discharged through the outport, and the flow path is formed in a longitudinal direction of the damping portion to be continuously connected from the inport to the outport.

14 Claims, 4 Drawing Sheets

(51) Int. Cl.
*B60T 8/42* (2006.01)
*B60T 8/48* (2006.01)

(58) Field of Classification Search
USPC .............................. 303/10, 116.4; 138/30, 31
See application file for complete search history.

(56) References Cited

U.S. PATENT DOCUMENTS

| | | | |
|---|---|---|---|
| 5,232,273 A * | 8/1993 | Eckstein | B60T 8/4031 137/539 |
| 5,417,481 A * | 5/1995 | Megerle | B60T 8/42 138/42 |
| 5,540,486 A * | 7/1996 | Linkner | B60T 8/348 137/565.34 |
| 5,921,636 A | 7/1999 | Roberts | |
| 6,203,117 B1 * | 3/2001 | Starr | B60T 8/368 138/31 |
| 6,375,279 B1 | 4/2002 | Cassidy et al. | |
| 9,096,200 B2 * | 8/2015 | Zeoli | B60T 7/22 |
| 2012/0133201 A1 * | 5/2012 | Zeoli | B60T 7/22 303/11 |
| 2013/0062934 A1 | 3/2013 | Daher | |
| 2015/0314764 A1 * | 11/2015 | Doh | B60T 7/042 303/10 |
| 2015/0360662 A1 * | 12/2015 | Doh | B60T 13/148 303/87 |

FOREIGN PATENT DOCUMENTS

| | | |
|---|---|---|
| CN | 102741102 A | 10/2012 |
| CN | 104266165 A | 1/2015 |
| DE | 10318613 B3 | 1/2005 |
| DE | 102015005436 A1 | 11/2015 |
| DE | 102015007390 A1 | 12/2015 |
| EP | 0401320 B1 | 2/1994 |
| JP | H02225802 A | 9/1990 |
| JP | H1016760 A | 1/1998 |
| JP | 2005-240646 A | 9/2005 |
| JP | 2013147176 A | 8/2013 |
| KR | 10-2003-0006155 A | 1/2003 |

OTHER PUBLICATIONS

Korean Notice of Allowance dated Dec. 20, 2016 issued in Korean Patent Application No. 10-2015-0126783 (English translation).
German Office Action dated Jul. 20, 2017 issued in German Patent Application No. 102016216873.8.
Chinese Office Action dated Jan. 4, 2018 issued in Chinese Patent Application No. 201610804114.0.

* cited by examiner

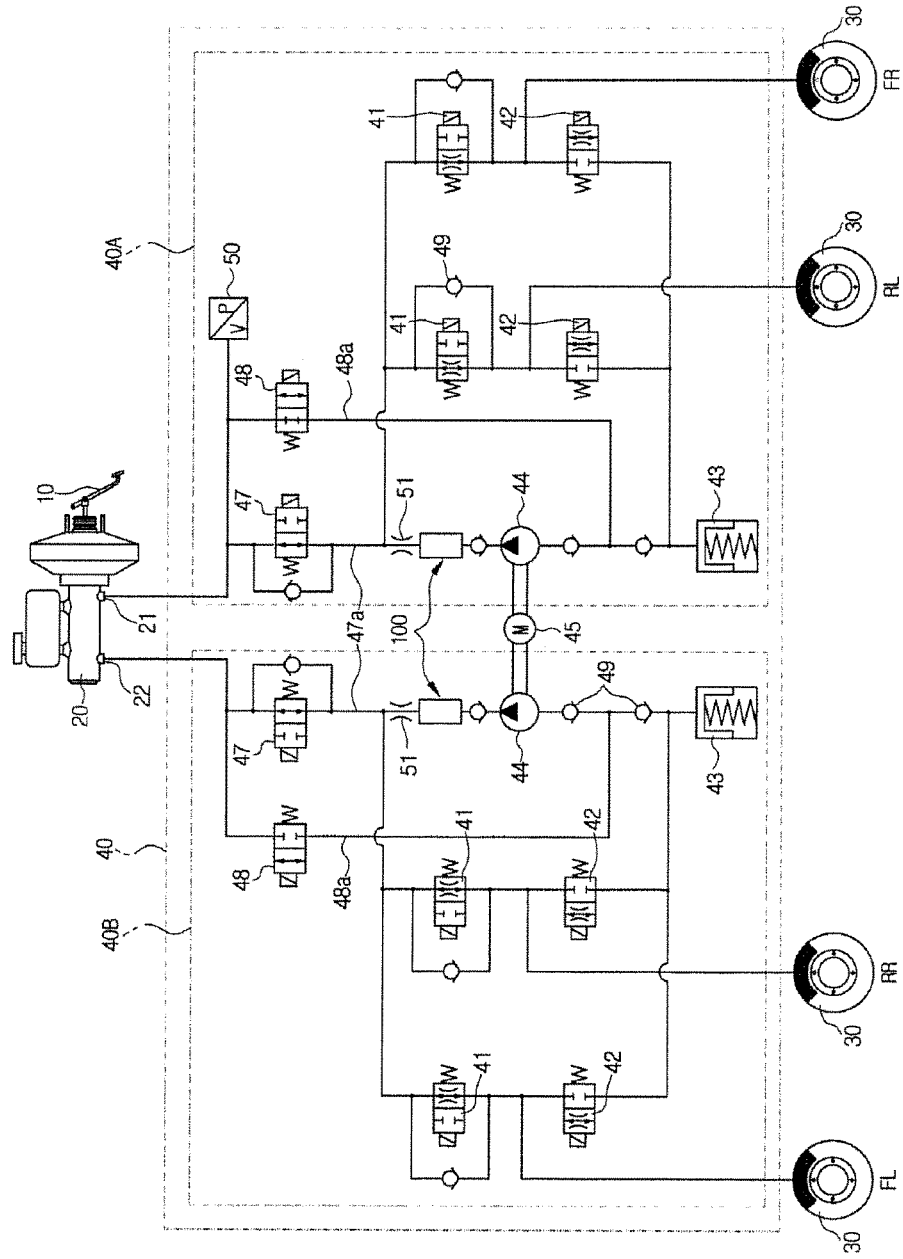
[FIG. 1]

[Fig 2]
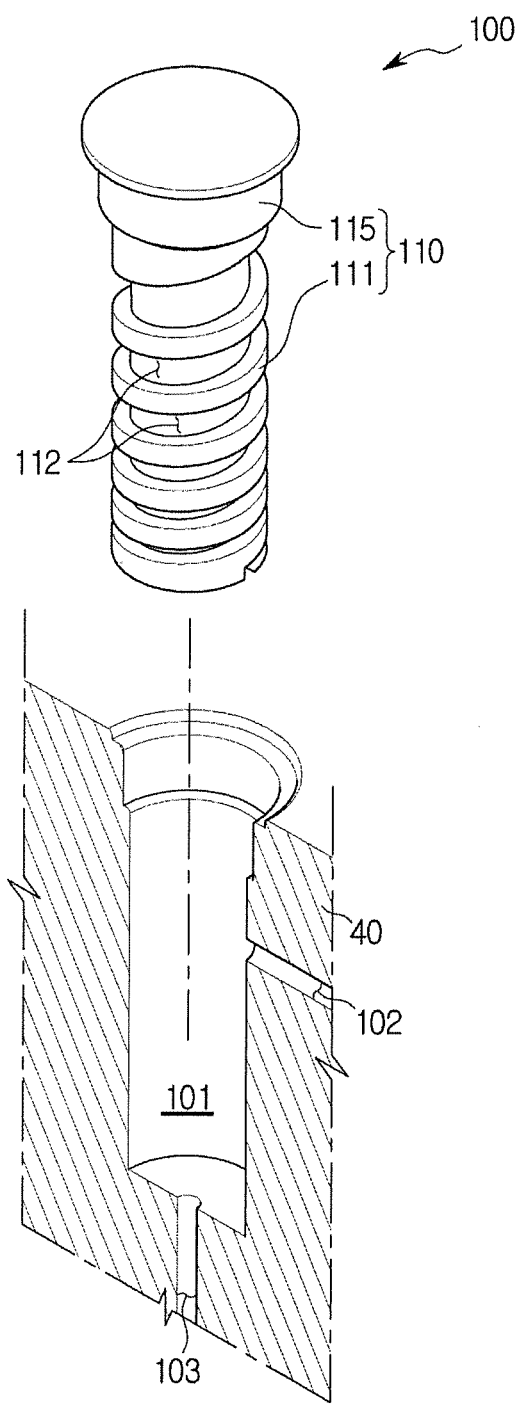

[Fig 3]
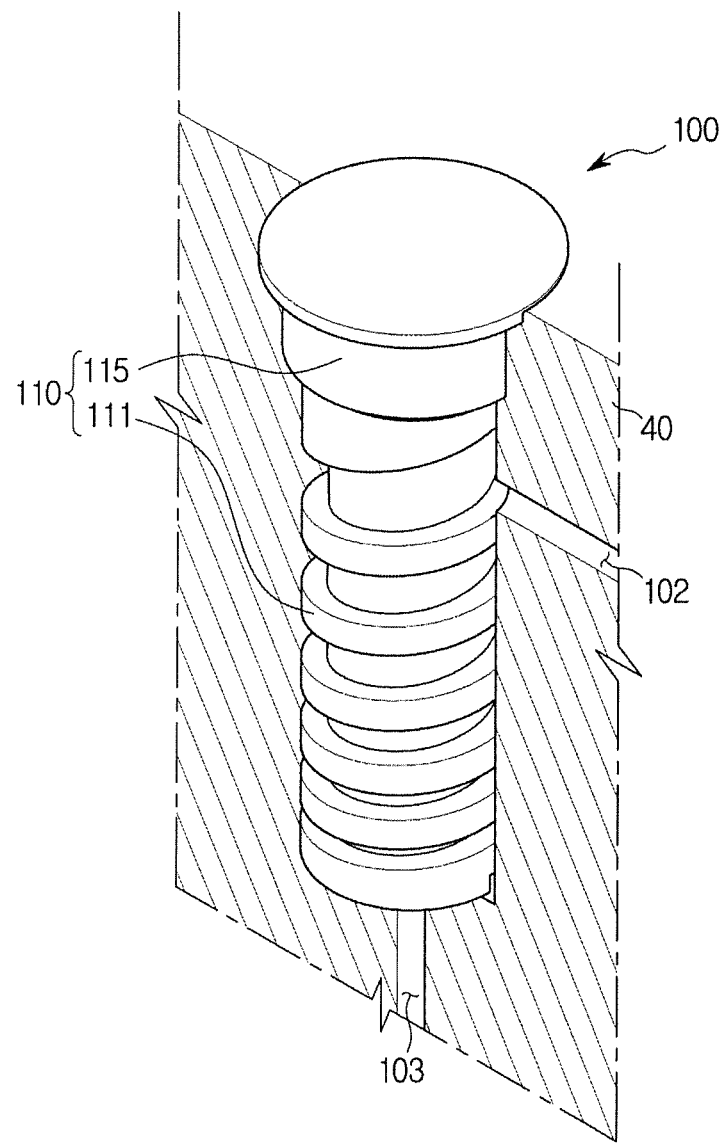

[Fig 4]
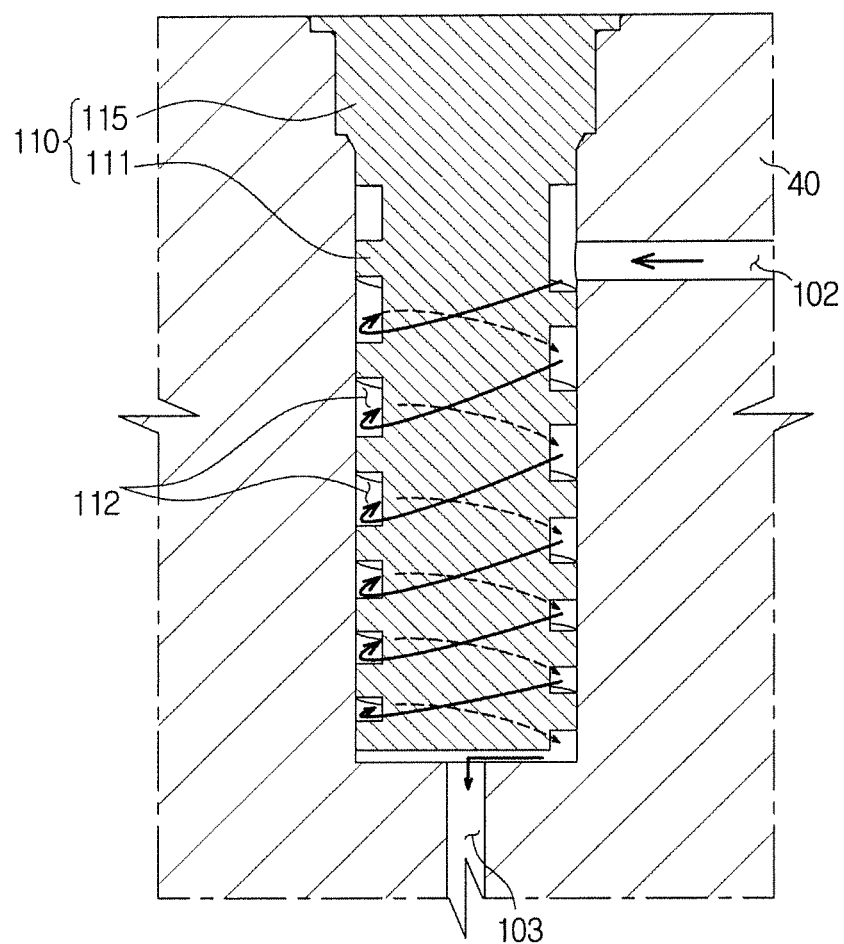

PULSATION DAMPING DEVICE OF HYDRAULIC BRAKE SYSTEM

CROSS-REFERENCE TO RELATED APPLICATION

This application claims the benefit of Korean Patent Application No. 2015-0126783, filed on Sep. 8, 2015 in the Korean Intellectual Property Office, the disclosure of which is incorporated herein by reference.

BACKGROUND

1. Field

Embodiments of the present disclosure relate to a hydraulic brake system, and more particularly, to a pulsation damping device of a hydraulic brake system which attenuates a pressure pulsation of brake oil discharged from a pump.

2. Description of the Related Art

In general, in order to control brake hydraulic pressure to be transferred to a brake of a vehicle, a hydraulic brake system includes a modulator block, in which a plurality of solenoid valves, a low pressure accumulator in which oil is temporarily stored, a pump disposed to be connected to an outlet of the low pressure accumulator for pumping the oil stored in the low pressure accumulator, and a motor for driving the pump are installed, and an electronic control unit (ECU) for controlling components by which the modulator block is electrically operated.

Such a hydraulic brake system adopts and uses various structures including a pulsation damping device having a predetermined damping space for attenuating a pressure pulsation which is generated because hydraulic pressure of brake oil discharged from a pump is at high pressure, an orifice portion at an outport through which brake oil is discharged via the pulsation damping device, etc. For example, a generally known pulsation damping device is formed to attenuate a pressure pulsation generated according to pressure discharged from a pump by having a damping space, a spring provided in the damping space, a piston elastically supported by the spring, a sealing member for shielding the damping space from the outside, etc.

However, since a structure for installation of the above-described pulsation damping device is complex, there are problems in that a manufacturing process is difficult and cost is also increased. Further, since a structure in which the pressure pulsation is attenuated using the spring is formed, there is a problem in that a pressure pulsation attenuation function is not smoothly performed because durability of the spring or the like is degraded when the spring is used for a long time.

SUMMARY

Therefore, it is an aspect of the present disclosure to provide a pulsation damping device of a hydraulic brake system having a simple structure to be easily installed and capable of efficiently attenuating a pressure pulsation.

Additional aspects of the disclosure will be set forth in part in the description which follows and, in part, will be obvious from the description, or may be learned by practice of the disclosure.

In accordance with one aspect of the present disclosure, a pulsation damping device of a hydraulic brake system which attenuates a pressure pulsation of brake oil discharged from a pump, the device comprising: a damping portion installed to be inserted into a bore in communication with an inport into which the brake oil flows and an outport through which the brake oil is discharged; and a cap coupled to one end of the bore to block the one end, wherein a flow path is formed on an outer circumferential surface of the damping portion to guide the brake oil introduced into the inport to be discharged through the outport, and the flow path is formed in a longitudinal direction of the damping portion to be continuously connected from the inport to the outport.

The flow path is formed so that size of area through which the brake oil flows is variable.

The flow path includes a portion where size of area decreases as going from the inport to the outport.

Size of the portion where the size of the area of the flow path decreases smoothly decreases.

The flow path is formed in a spiral shape in a longitudinal direction of the damping portion.

The cap and the damping portion are integrally formed.

The flow path connects the inport in communication with an inner circumferential surface of the bore with the outport in communication with a closed end surface of the bore.

An outer circumferential surface of the damping portion is in contact with an inner circumferential surface of the bore, and a lower end thereof is installed to be spaced a predetermined gap from a bottom surface of the bore.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a hydraulic circuit diagram schematically illustrating a hydraulic brake system provided with a pulsation damping device according to an exemplary embodiment of the present disclosure.

FIG. 2 is a perspective view of an assembly illustrating a state in which a pulsation damping device provided in a hydraulic brake system according to an exemplary embodiment of the present disclosure is being assembled in a modulator block.

FIG. 3 is a perspective view of the assembly shown in FIG. 2.

FIG. 4 is a cross-sectional view illustrating a flow of brake oil whose pressure pulsation is attenuated by the pulsation damping device of the hydraulic brake system.

DETAILED DESCRIPTION

Hereinafter, embodiments of the present disclosure will be described in detail with reference to accompanying drawings. The accompanying drawings are examples which provide the concept of the present disclosure to those skilled in the art. The present disclosure is not limited to the accompanying embodiments and may be implemented in different forms. Parts irrelevant to description are omitted in the drawings in order to clearly describe the present disclosure, and widths, lengths, and thicknesses of components in the drawings may be exaggerated for convenience of description.

FIG. 1 is a hydraulic circuit diagram schematically illustrating a hydraulic brake system provided with a pulsation damping device according to an exemplary embodiment of the present disclosure.

Referring to FIG. 1, the hydraulic brake system includes a brake pedal 10 to which an operating force of a driver is applied, a brake booster 11 which increases pedal effort due to the pedal effort of the brake pedal 10, using a pressure difference between vacuum pressure and atmospheric pressure, a master cylinder 20 which generates pressure using the brake booster 11, a first hydraulic circuit 40A which connects a first port 21 of the master cylinder 20 and wheel cylinders 30 provided on two wheels FR and RL and controls hydraulic pressure transmission, and a second hydraulic circuit 40B which connects a second port 22 of the master cylinder 20 and wheel cylinders 30 provided on the two remaining wheels FL and RR and controls hydraulic pressure transmission. The first hydraulic circuit 40A and the second hydraulic circuit 40B are compactly installed in a modulator block 40.

Each of the first hydraulic circuit 40A and the second hydraulic circuit 40B includes solenoid valves 41 and 42 for controlling brake hydraulic pressure transferred to two pairs of wheel cylinders 30, a pump 44 for suctioning and pumping brake oil discharged from wheel cylinders 30 or brake oil discharged from the master cylinder 20 by driving a motor 45, a low pressure accumulator 43 for temporarily storing the brake oil discharged from the wheel cylinders 30, a main flow path 47a which connects an outlet of the pump 44 to the master cylinder 20, an auxiliary flow path 48a which guides the brake oil from the master cylinder 20 to an inlet of the pump 44 to be suctioned, and an electronic control unit (ECU) (not shown) which controls driving of the plurality of solenoid valves 41 and 42 and the motor 45.

Here, as shown in the drawing, the solenoid valves 41 and 42, the low pressure accumulator 43, the pump 44, the main flow path 47a, and the auxiliary flow path 48a are provided in each of the first and second hydraulic circuits 40A and 40B.

More specifically, the plurality of solenoid valves 41 and 42 are related to upstream side and downstream side of each of the wheel cylinders 30 and are classified as a normal open type solenoid valve 41, which is disposed at the upstream side of each wheel cylinder 30 and usually maintains an open state, and a normal closed type solenoid valve 42 which is disposed at the downstream side of each wheel cylinder 30 and usually maintains a closed state. Opening and closing operations of the solenoid valves 41 and 42 are controlled by the ECU, and the normal closed type solenoid valve 42 is opened by decompression braking so that brake oil discharged from the wheel cylinder 30 is temporarily stored in the low pressure accumulator 43.

The pump 44 is driven by the motor 45 and suctions and discharges the brake oil stored in the low pressure accumulator 43, and hydraulic pressure is thus transferred to the wheel cylinder 30 or the master cylinder 20.

Further, a normal open type solenoid valve 47 (hereinafter, a TC valve) for a traction control system (TCS) is installed in the main flow path 47a which connects the master cylinder 20 to an outlet of the pump 44. The TC valve 47 usually maintains an open state and, during a general braking using the brake pedal 10, transfers brake hydraulic pressure generated from the master cylinder 20 to the wheel cylinder 30 through the main flow path 47a.

Further, the auxiliary flow path 48a is branched from the main flow path 47a to guide brake oil discharged from the master cylinder 20 to be suctioned at the inlet of the pump 44, and a shuttle valve 48 is installed on the auxiliary flow path 48a so that the brake oil is only introduced into the inlet of the pump 44. The shuttle valve 48 which is electrically operated is installed in the middle of the auxiliary flow path 48a, is usually closed, and is operated to be open in a TCS mode.

Meanwhile, the unmentioned reference number '49' is a check valve installed at a suitable position in a flow path for preventing a backflow of brake oil, the reference number '50' is a pressure sensor which detects a brake pressure transferred to the TC valve 47 and the shuttle valve 48, and the reference number '51' is an orifice.

When braking is performed in the hydraulic brake system described above, a pressure pulsation is generated from a hydraulic pressure pumped from the pump 44 according to operation of the motor 45. Thus, according to one embodiment of the present disclosure, a pulsation damping device 100 connected to the outlet of the pump 44 of each of the hydraulic circuits 40A and 40B is provided for attenuating a pressure pulsation.

FIG. 2 is a perspective view of an assembly illustrating a state in which a pulsation damping device provided in a hydraulic brake system according to an exemplary embodiment of the present disclosure is being assembled in a modulator block, FIG. 3 is a perspective view of the assembly shown in FIG. 2, and FIG. 4 is a cross-sectional view illustrating a flow of brake oil whose pressure pulsation is attenuated by the pulsation damping device of the hydraulic brake system.

Referring to FIGS. 2 to 4, the pulsation damping device 100 according to one embodiment of the present disclosure is provided at an inport 102 through which brake oil discharged from the pump 44 (see FIG. 1) flows and a bore 101 in communication with an outport 103 through which brake oil is discharged. Here, as the pulsation damping device 100 is provided in the main flow path 47a (see FIG. 1), the inport 102 is connected to the main flow path 47a connected to the outlet of the pump 44, and the outport 103 is connected to the main flow path 47a connected to the master cylinder 20. The pulsation damping device 100 includes a damping member 110 installed in the bore 101 and configured to guide the brake oil introduced into the inport 102 to be discharged through the outport 103.

The damping member 110 includes a cap 115 which blocks one end of the bore 101 and a guide portion 111 which guides the flow of brake oil. Here, the cap 115 and the guide portion 111 are integrally formed.

The cap 115 is installed to block one open end of the bore 101. That is, the cap 115 prevents oil introduced into the bore 101 from leaking to the outside.

The guide portion 111 is installed to be in contact with an inner circumferential surface of the bore 101. A flow path 112 is formed in the guide portion 111 to guide the brake oil introduced into the inport 102 to be discharged through the outport 103.

The flow path 112 is formed on an outer circumferential surface of the guide portion 111. More specifically, the flow path 112 is formed in a spiral shape on the outer circumferential surface of the guide portion 111. Thus, brake oil is guided along the flow path 112 and discharged through the outport 103. That is, the pulsation damping device 100 according to one aspect of the present disclosure forcibly guides the flow of the brake oil so that the brake oil is discharged through the outport 103. In the flow path 112, size of area through which brake oil passes is formed to be variable. For example, in the flow path 112, the size of area decreases as going from the inport 102 to the outport 103. Accordingly, when brake oil introduced into the inport 102 flows along the flow path 112, the size of the area through which the brake oil flows is reduced and resistance against the oil flow is thus generated. Thus, a pressure pulsation of brake oil at high pressure decreases, and the brake oil flows along the flow path 112. It is illustrated and described that the size of area of the flow path 112 through which the brake oil flows is smoothly decreased, but the present invention is not limited thereto and the size may be irregularly decreased. Further, pitch of the flow path 112 formed in the guide portion 111 may be selectively increased or decreased.

A lower end of the damping member 110 is installed to be spaced a predetermined gap from a bottom surface of the bore 101 so that brake oil introduced into the bore 101 is discharged through the flow path 112. That is, the flow path 112 is connected to each of the inport 102 and the outport 103 via a predetermined space formed between the damping member 110 and the bottom surface of the bore 101, guides the flow of the brake oil, and attenuates a pressure pulsation of brake oil discharged from the pump 44.

Meanwhile, the damping member 110 may be formed of a steel or plastic material having high stiffness using an injection-molding or forging method. Accordingly, cost can be reduced. Further, the damping member 110 may be formed of a rubber material having elasticity. That is, when a rubber material is used for the damping member 110, a volume of the flow path 112 is changed according to an inflow of brake oil at high pressure so as to improve damping effect and mitigate impacts, and thus a pressure pulsation may be attenuated.

Subsequently, a state in which a pressure pulsation is attenuated by the pulsation damping device 100 will be described.

Brake oil discharged at high pressure by pumping of the pump 44 is transferred to the pulsation damping device 100 through the inport 102. The brake oil introduced through the inport 102 is forcibly guided by the flow path 112 formed in the damping member 110 and is discharged through the outport 103. Here, size of area of the flow path 112 is formed to decrease toward the outport 103 so that pressure is changed by a change in speed of the brake oil. That is, the size of area through which the brake oil passes is decreased, resistance against an oil flow is increased, and thus a pressure pulsation can be attenuated.

As is apparent from the above description, it is advantageous that a pressure pulsation can be attenuated because the pulsation damping device of a hydraulic brake system according to one embodiment of the present disclosure is provided with a flow path in a spiral shape formed on an outer circumferential surface of a damping member so that a flow path has an increased length.

Further, it is advantageous that a pressure pulsation can be attenuated by inducing a change in pressure based on a change in flow speed of brake oil by forming size of area of a flow path to be variable and decreasing as going from an inport to an outport, and thus operating noise can be reduced.

Meanwhile, it is advantageous that, in addition to installation time reduction, manufacturing cost can be reduced by manufacturing a pulsation damping device using an injection-molding or forging method, by providing the pulsation damping device as a single member.

As described above, while the present disclosure has been described with reference to specific embodiments and drawings, the present disclosure is not limited thereto. It should be clear to those skilled in the art that various modifications and alterations may be made without departing from the spirit and scope of the present disclosure and equivalents of the appended claims.

REFERENCE NUMERALS

100: Pulsation Damping Device
101: Bore
102: Inport
103: Outport
110: Damping Member
112: Flow Path

What is claimed is:

1. A pulsation damping device of a hydraulic brake system which attenuates a pressure pulsation of brake oil discharged from a pump, the device comprising:
    a damping portion installed to be inserted into a bore in communication with an inport into which the brake oil flows and an outport through which the brake oil is discharged; and
    a cap coupled to one end of the bore to block the one end, wherein the damping portion has a plurality of recesses formed on an outer surface of the damping portion and having different widths along a longitudinal direction of the damping portion,
    the plurality of recesses are circumferential to the damping portion to form a flow path to guide the brake oil introduced into the inport to be discharged through the outport, and
    the flow path is formed in the longitudinal direction of the damping portion to be continuously connected from the inport to the outport.

2. The device of claim 1, wherein the damping portion includes a portion where the widths decrease as going from the inport to the outport.

3. The device of claim 2, wherein the decreasing widths of the portion decreases smoothly.

4. The device of claim 1, wherein the flow path is formed in a spiral shape in the longitudinal direction of the damping portion.

5. The device of claim 1, wherein the cap and the damping portion are integrally formed.

6. The device of claim 1, wherein the flow path connects the inport in communication with an inner circumferential surface of the bore with the outport in communication with a closed end surface of the bore.

7. The device of claim 1, wherein an outer circumferential surface of the damping portion is in contact with an inner circumferential surface of the bore, and a lower end thereof is installed to be spaced a predetermined gap from a bottom surface of the bore.

8. A pulsation damping device of a hydraulic brake system which attenuates a pressure pulsation of brake oil discharged from a pump, the device comprising:
    a damping portion installed to be inserted into a bore in communication with an inport into which the brake oil flows and an outport through which the brake oil is discharged; and
    a cap coupled to one end of the bore to block the one end, wherein the damping portion has a plurality of connected recesses formed on an outer surface of the damping portion and one of the connected recesses has a width greater than other ones of the recesses,
    the plurality of recesses are circumferential to the damping portion to form a flow path to guide the brake oil introduced into the inport to be discharged through the outport, and
    the flow path is formed in a longitudinal direction of the damping portion to be continuously connected from the inport to the outport.

9. The device of claim 8, wherein the damping portion includes a portion where the widths decrease as going from the inport to the outport.

10. The device of claim 9, wherein the decreasing widths of the portion decreases smoothly.

11. The device of claim 8, wherein the flow path is formed in a spiral shape in the longitudinal direction of the damping portion.

12. The device of claim 8, wherein the cap and the damping portion are integrally formed.

13. The device of claim 8, wherein the flow path connects the inport in communication with an inner circumferential surface of the bore with the outport in communication with a closed end surface of the bore.

14. The device of claim 8, wherein an outer circumferential surface of the damping portion is in contact with an inner circumferential surface of the bore, and a lower end thereof is installed to be spaced a predetermined gap from a bottom surface of the bore.

* * * * *